US008235361B2

(12) United States Patent
Feinstein

(10) Patent No.: US 8,235,361 B2
(45) Date of Patent: Aug. 7, 2012

(54) STRUCTURED PACKING FOR A REACTOR

(75) Inventor: Jonathan Jay Feinstein, North Salem, NY (US)

(73) Assignee: Tribute Creations, LLC, Windsor Locks, CT (US)

(*) Notice: Subject to any disclaimer, the term of this patent is extended or adjusted under 35 U.S.C. 154(b) by 162 days.

(21) Appl. No.: 12/688,948

(22) Filed: Jan. 18, 2010

(65) Prior Publication Data
US 2010/0202942 A1 Aug. 12, 2010

Related U.S. Application Data

(60) Provisional application No. 61/207,170, filed on Feb. 9, 2009.

(51) Int. Cl.
*B01J 19/32* (2006.01)

(52) U.S. Cl. ........... 261/94; 261/19; 261/80; 261/95; 261/96; 261/97; 261/100; 261/101; 261/102; 261/103; 261/104; 261/105; 261/106; 261/107; 261/108; 261/109; 261/110; 261/112.2; 261/113; 261/114.5; 261/DIG. 72; 422/310; 422/311; 422/312; 422/211; 422/236; 422/239

(58) Field of Classification Search ........... 422/310, 422/311, 312, 211, 236, 239; 261/19, 80, 261/94–97, 100–110, 112.2, 113–114.5, 261/DIG. 72
See application file for complete search history.

(56) References Cited

U.S. PATENT DOCUMENTS

| 4,340,501 A | 7/1982 | Davidson |
| 4,719,090 A | 1/1988 | Masaki |
| 4,882,130 A | 11/1989 | Asai et al. |
| 4,985,230 A | 1/1991 | Baden et al. |
| 6,534,022 B1 | 3/2003 | Carlborg et al. |
| 2004/0013580 A1 | 1/2004 | Bruck et al. |

FOREIGN PATENT DOCUMENTS

| EP | 1317956 A2 | 6/2003 |
| WO | WO 2006/058060 A2 | 6/2006 |

OTHER PUBLICATIONS

Written Opinion of the International Searching Authority issued in related International Application PCT/US2010/021401 mailed Aug. 30, 2010 (3 pages).
International Search Report of the International Searching Authority issued in related International Application PCT/US2010/021401 mailed Aug. 30, 2010 (3 pages).

(Continued)

*Primary Examiner* — Brian R Gordon
*Assistant Examiner* — Shogo Sasaki
(74) *Attorney, Agent, or Firm* — Robert P. Michal; Lucas & Mercanti, LLP

(57) ABSTRACT

A structured packing for a reactor is formed from a metal sheet to promote heat and mass transfer near the wall of the reactor. The structured packing causes lateral flow of fluids flowing through the packing such that jet impingement of at least one reactor wall is promoted. The packing may be used in a cylindrical, annular or plate-type reactor, e.g., a catalytic reactor, or a heat exchanger.

12 Claims, 5 Drawing Sheets

OTHER PUBLICATIONS

M.J.W. Frank, J.A.M. Kuipers, G.F. Versteeg & W.P.M. Van Swaaij, "The Performance of Structured Packings in Trickle-Bed Reactors," Trans IChemE, vol. 77, Part A, Oct. 1999 (16 pages).

Kalyani Pangarkar, Tilman J. Schildbauer, J. Ruud van Ommen, John Nijenhuis, Freek Kapteijn & Jacob A. Moulijn, "Structured Packings for Multiphase Catalytic Reactors," Ind. Eng. Chem. Res. 2008, vol. 47, pp. 3720-3751 (32 pages).

Radu V. Vladea, Natalia Hinrichs, Robert R. Hudgins, Sam Suppiah & Peter L. Silveston, "High-Efficiency Structured-Packing Catalysts with Activated Carbon for $SO_2$ Oxidation from Flue Gas," Energy & Fuels 1997, vol. 11, pp. 277-283 (7 pages).

STRUCTURED PACKING FOR A REACTOR

CROSS-REFERENCE TO RELATED APPLICATION

This application claims the priority of U.S. provisional application Ser. No. 61/207,170 filed Feb. 9, 2009. The disclosure of the foregoing application is incorporated by reference herein in its entirety.

FIELD OF THE INVENTION

The invention pertains to a structured packing for a reactor. The packing may be used in a cylindrical, annular or plate-type reactor, e.g., a catalytic reactor, or a heat exchanger.

BACKGROUND OF THE INVENTION

Reactors such as chemical reactors and heat exchangers are widely used to promote heat transfer, mass transfer and/or chemical reaction rates. In the case of reactors such as chemical reactors, there is often a need to transfer heat into the reactor (e.g., for endothermic reactions) or to transfer heat from the reactor (e.g., exothermic reactions). In commercial practice, in order to achieve economies of scale, it is desirable to use reactors having large diameters. A high heat transfer coefficient within the reactor is desirable in order to promote transfers of heat between the reactor contents and the environment. A high heat transfer coefficient within the reactor is especially desirable near the outside diameter of the reactor, where the ratio of surface area for radial heat flux to the internal volume is lowest and where the amount of heat to be transferred radially is proportional to the volume internal to the source of the reactor. Friction between fluids and the reactor wall often results in relatively low velocities and accordingly relatively lower heat transfer coefficients near the reactor wall where higher heat transfer coefficients are most desirable.

In the case of fixed bed, heterogeneous and catalytic reactors, heat transfer into the reactor wall may limit the reaction rate for endothermic reactions or heat transfer from the reactor may limit the control or safe operation for exothermic reactions. In general, it is desirable to limit the number of internal walls within the reactor to accordingly minimize the number of boundary layers of low velocity and low heat transfer coefficient that heat must pass through in the radial direction. Higher surface area in catalytic reactors provides greater opportunity for acceleration of reactions by providing more sites for catalyst to be effectively deployed. In particular, high geometric surface area near the wall of catalytic reactors increases the available heat for conducting exothermic reactions and the heat sink for endothermic reactions at short distances for heat to travel out of or into the reactors, respectively.

THE PRIOR ART

It is known that engineered packing consisting of metal substrates can be constructed in a manner so as to contain thinner walls than may be possible in randomly packed beds for catalysis and thereby contain increased geometric surface area at a comparable or lower pressure drop compared to what could be attained in a randomly packed bed. It is also known that engineered packing can be designed to provide desirably high heat transfer coefficients near the reactor wall.

U.S. Pat. Nos. 4,882,130, 4,719,090 and 4,340,501 pertain to engineered packing of diverse designs for providing uniform improvements of geometric surface area and heat transfer throughout the volume of the reactor at desirably low pressure drop without differentially superior heat transfer or geometric surface area near the reactor wall.

U.S. Pat. No. 4,985,230 discloses an engineered packing suitable for use in annulus or between two walls that provides alternating columns of channels that respectively direct fluid toward the first wall and toward the second wall to induce turbulence of fluid passing through the reactor. Such packing provides desirable heat transfer and geometric surface area near the reactor walls at desirably low pressure drop, but has the disadvantage of being difficult to manufacture.

Published patent application US2004/0013580 pertains to a filter body for removing soot particles from diesel engine exhaust. The disclosed structure which is designed to cause fluid to flow through adjacent filter sheets is unsuitable for causing fluid to impinge on and deflect back from a wall to provide desirable heat transfer.

PCT Application PCT/US2005/42425 discloses a non-annular reactor containing a core structure near the reactor axis and a casing structure between the core and the reactor wall.

OBJECTS OF THE INVENTION

It is an object of the invention to provide structured packing for a reactor that will increase the geometric surface area and/or the heat transfer coefficient, especially near the reactor wall, of reactors such as fixed bed heterogeneous catalytic reactors without greatly increasing their pressure drop.

It is a further object of the invention to provide structured packing for a heat exchanger that will increase the heat transfer coefficient of heat exchangers without greatly increasing their pressure drop.

The foregoing objects and other objects of the invention will be apparent from the details of the invention set forth below.

SUMMARY OF THE INVENTION

The structured packing of the invention is readily prepared by cutting a sheet and then folding the sheet into a structure comprising alternating columns containing vanes disposed in opposite oblique orientation to the reactor axis for causing fluid to alternately impinge on and return from a wall of the reactor. The columns are separated from each other by substantially straight separating walls. The vanes folded from the same sheet are joined along their sides to the separating walls by webs folded from the same sheet. Preferably, the sheet is metal foil and the structure is preferably formed by progressive blanking folding dies.

The structured packing of the invention may be located near the inside diameter of a cylindrical reactor tube or enclosure, in the annulus of an annular reactor, or between two walls of another reactor shape such as between two flat walls in a plate-type heat exchanger. In all cases, the structured packing of the invention will cause fluid to impinge a reactor wall to thereby increase heat transfer through that wall.

DETAILED DESCRIPTION OF THE INVENTION

The structured packing of the invention is utilized in a reactor having an inlet, an outlet and at least one wall and comprises:
(a) a sheet folded back and forth, thereby forming a row of alternating first and second columns separated from each other by separating walls;
(b) first and second direction vanes located in the respective first and second columns such that at least some of the first vanes are inclined at an oblique angle to the reactor wall and at least some of the second vanes are inclined at an opposite oblique angle to the reactor wall;
(c) webs connecting the at least some of the first and second vanes to the separating walls along at least one lateral side of the at least some of the first and second vanes; and
(d) a multiplicity of gaps between the separating walls and the reactor wall, extending from the inlet to the outlet.

Preferably, the structured packing of the invention is formed from a single sheet which may be a metal sheet or foil. The opposite oblique angles referred to in paragraph (b) above may all have the same or different magnitude. The gaps referred to in paragraph (d) above are preferably discontinuous.

Typically, the reactor containing the structured packing of the invention will have a cylindrical shape and will contain inner and outer concentric walls and an annulus therebetween. The structured packing of the invention preferably comprises a row of alternating first and second columns with their respective first and second vanes, with the row being disposed in the annulus. It is also preferred that a plate be disposed in the annulus and the packing preferably comprises a row of alternating first and second columns with their respective first and second vanes, with the row being disposed in the annulus.

As mentioned above, the reactor may be a chemical reactor, e.g., a catalytic reactor, or it may be a heat exchanger. In the case of catalytic reactors, it is preferred that a catalyst be present on at least a portion of the surfaces of the sheet.

DETAILED DESCRIPTION OF THE DRAWINGS

Figure 1A:
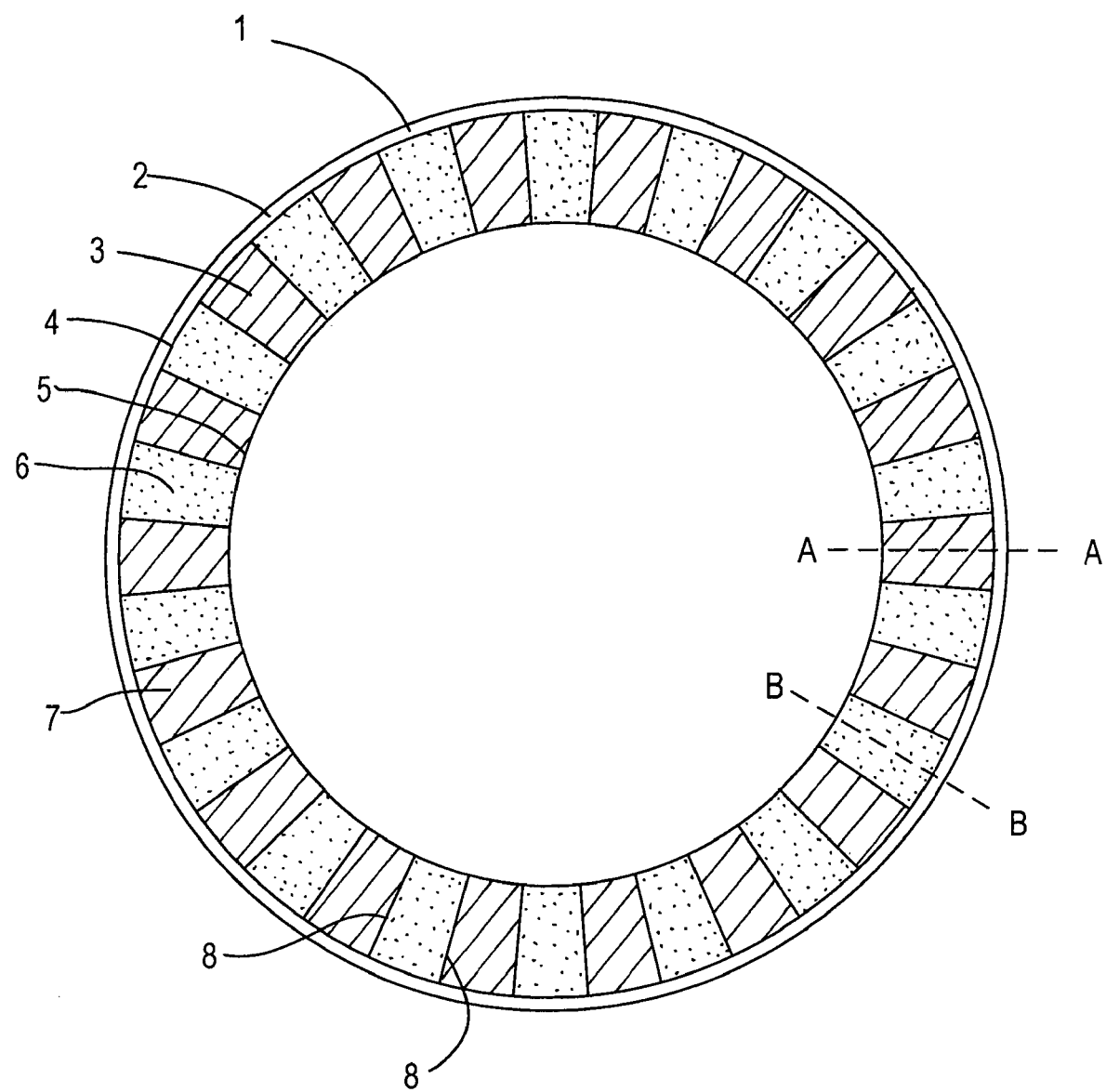
FIG. 1A is a transverse cross-section of the structured packing of the invention.

Referring to FIG. 1A, reactor 1 has a cylindrical wall 2 and structured packing 3, depicted as a shaded area, resides within wall 1. The outside diameter 4 of packing 3 corresponds to the inside diameter of wall 1. Packing 3 has an inside diameter 5 and is divided into longitudinal columns 6 (depicted by shaded and dotted areas), and longitudinal columns 7 (depicted by shaded and cross-hatched areas). Columns 6 and 7 alternate with each other and are separated from each other by radial walls 8. Reactor 1 has intermittent gaps (not shown) disposed between radial walls 8 and reactor wall 2 along the axial length of the reactor. Fluid flowing along the length of reactor 1 is directed in a centrifugal direction through columns 6 and in a centripetal direction while flowing through columns 7.

Figure 1B:
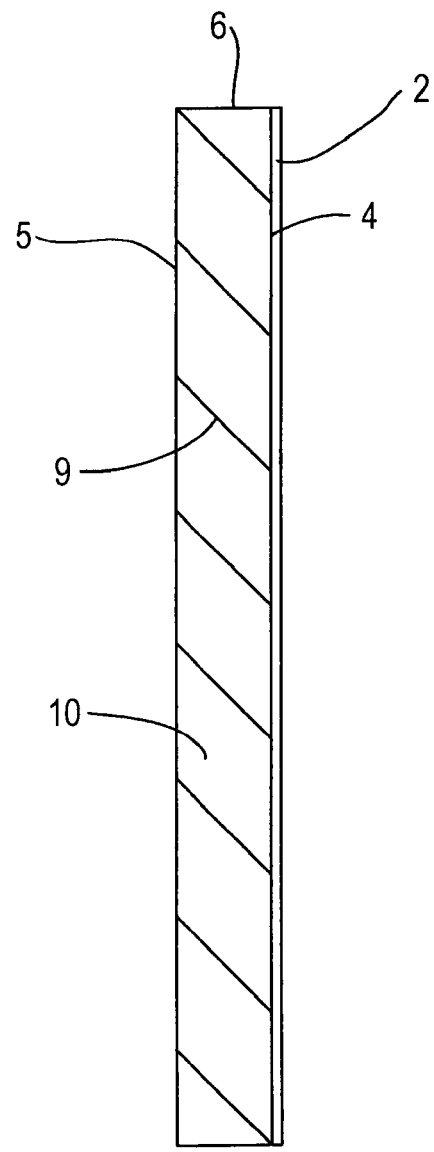
FIG. 1B is a longitudinal, radial cross-section of the structured packing of the invention (corresponding to cross-section AA in FIG. 1A) showing centripetal vanes.

Referring to FIG. 1B (which is a longitudinal section of reactor 1 through section B-B of FIG. 1A), column 6 extends from its outside diameter 4 to its inside diameter 5. Column 6 is bounded at its outside diameter 4 by reactor wall 2. The axial length of column 6 contains vanes 9. Vanes 9 form channels 10 which direct fluid centrifugally as the fluid passes from the top to the bottom of reactor 1.

Figure 1C:
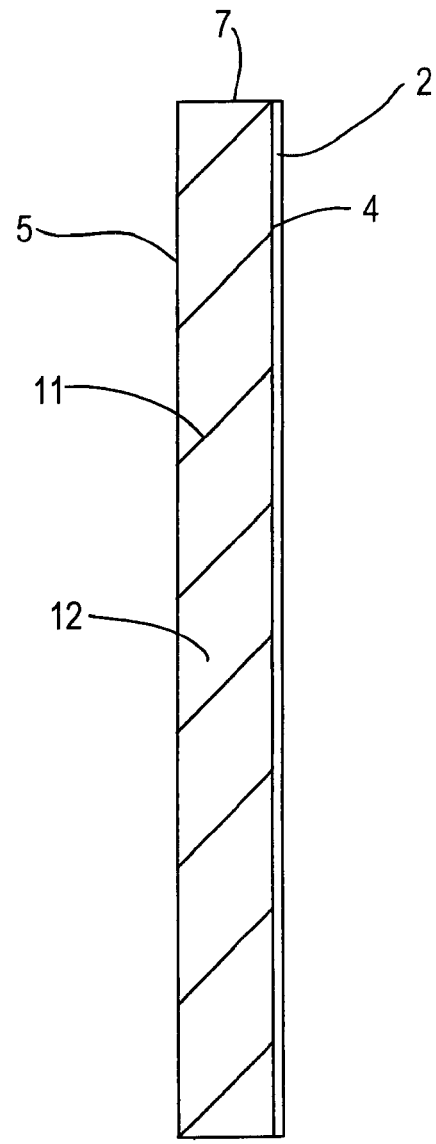
FIG. 1C is a longitudinal, radial cross-section of the structured packing of the invention (corresponding to cross-section BB in FIG. 1A) showing centripetal vanes.

Referring to FIG. 1C (which is a longitudinal section of reactor 1 through section A-A of FIG. 1A), centripetal column 7 extends from its outside diameter 4 to its inside diameter 5. Column 7 is bounded at its outside diameter 4 by reactor wall 2. The axial length of column 7 contains vanes 11. Vanes 11 form channels 12 which direct fluid centripetally as the fluid passes from the top to the bottom of reactor 1.

Figure 2:
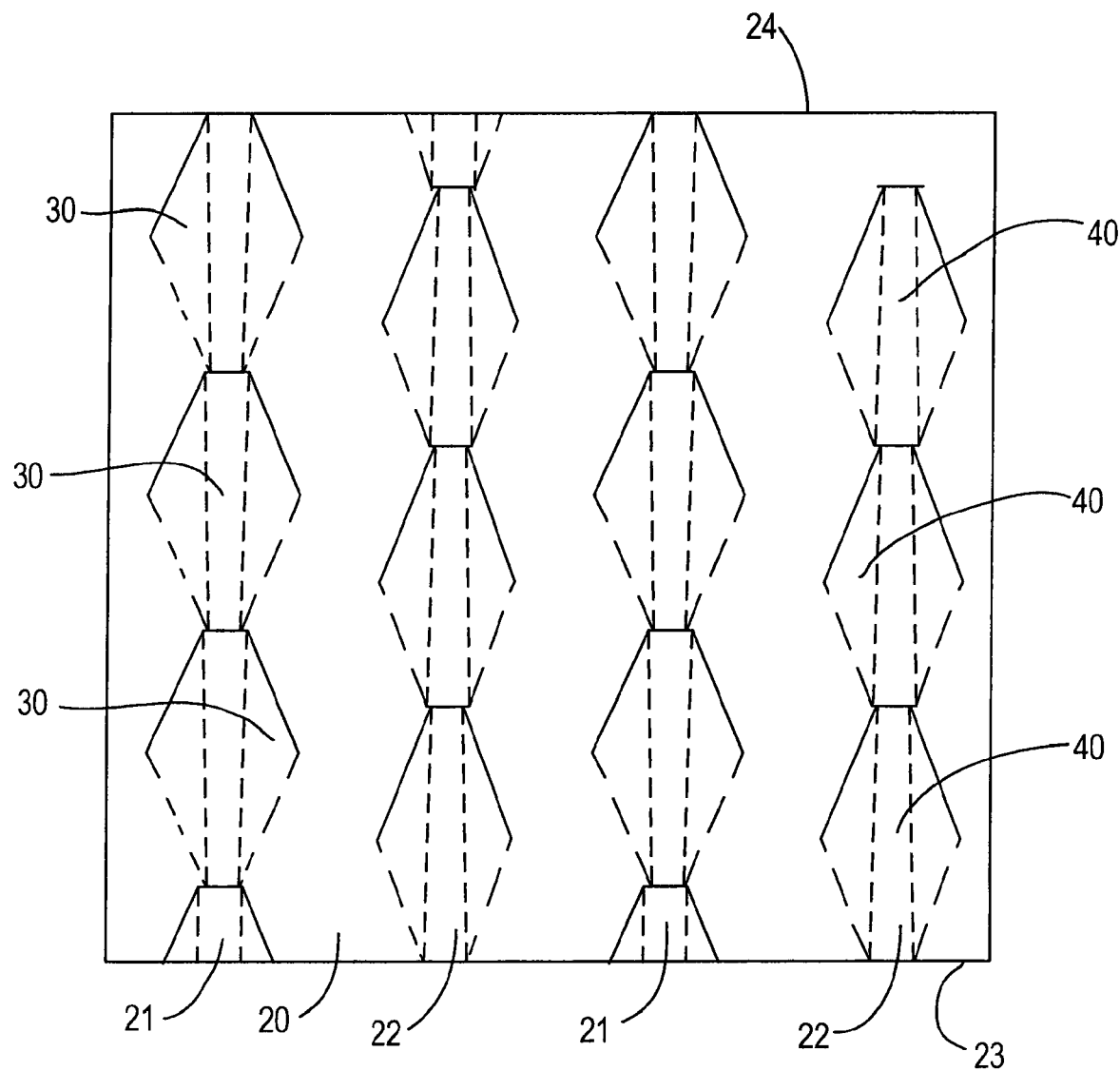
FIG. 2 is a plan view of a sheet to be formed into the structured packing of the invention.

Referring to FIG. 2, sheet 20 is formed into a structured packing of the invention by cutting and bending columns 21 consisting of repeated shapes 30 forming centripetal vanes, and columns 22 consisting of repeated shapes 40 forming centrifugal vanes. Sheet 20 comprises a ductile, rigid material and is preferably metal foil.

Figure 3:
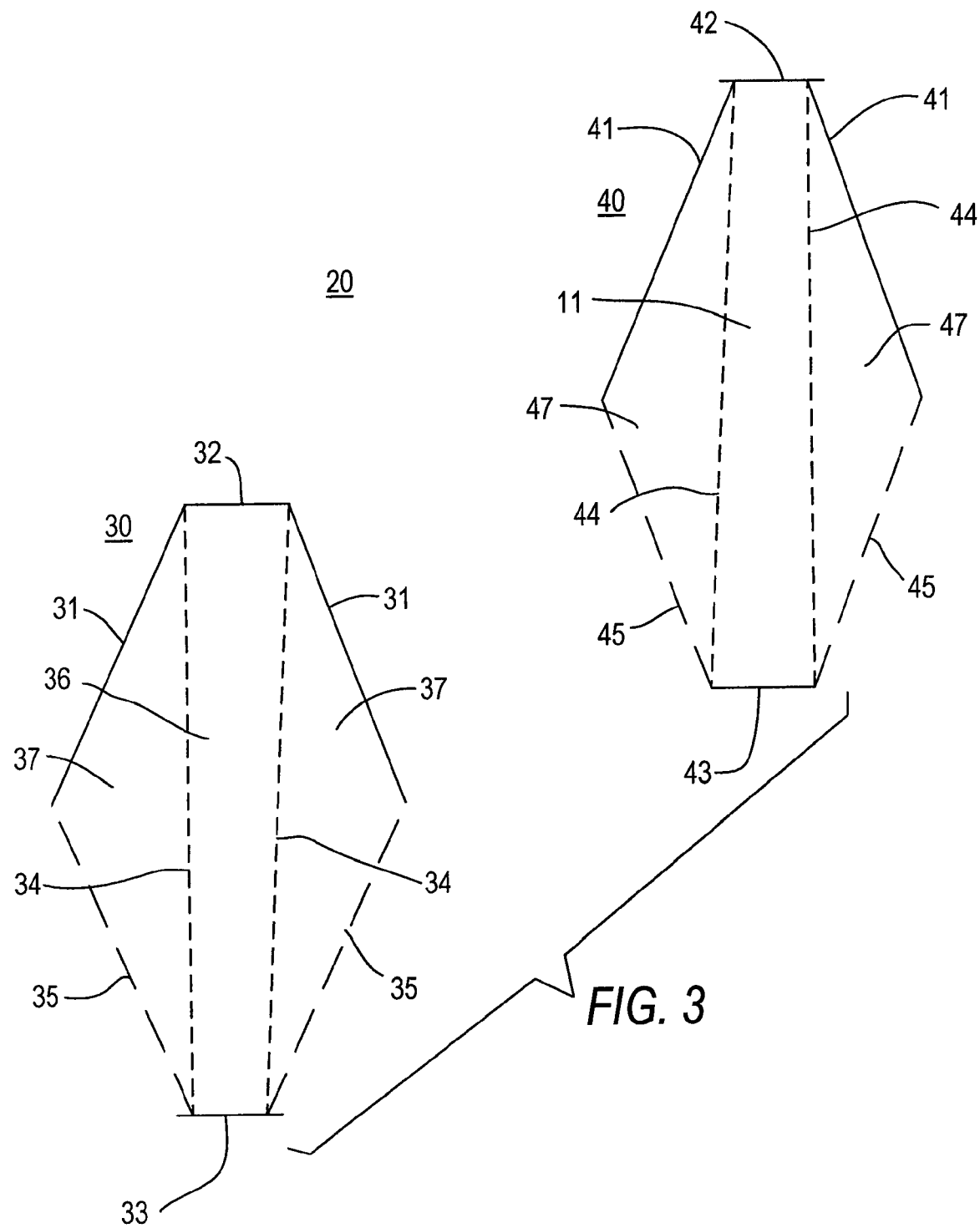
FIG. 3 is a more detailed view of a sheet to be formed into the structured packing of the invention.

Referring to FIG. 3, a shape 30 from column 21 of FIG. 2 and a shape 40 from column 22 of FIG. 2 are shown in greater detail. Shape 30 is formed from sheet 20 into a vane and its two lateral webs which connect the vane to the sheet from which it is formed. Solid lines depict where the sheet is cut. Dotted lines depict approximately 90° bends in the sheet. Dashed lines depict approximately 180° bends in the sheet.

Sheet 20 is cut along lines 31, 32 and 33, wherein horizontal line 33 corresponds to horizontal line 32 for the adjacent shape (not shown) that is similar to and below shape 30 that is shown. The sheet is folded approximately 90° away from the reader along lines 34 and folded approximately 180° toward the reader along lines 35. The thus-formed vane 9 consists of the essentially flat surface bounded by lines 32, 33 and 34. Vane 9 is attached to the rest of the sheet by webs 37 along the two sides of the vane. Webs 37 are bounded by lines 31, 34 and 35. For an annular or circular packing, vane 9 is preferably wider at its top rather than at its bottom as shown. Vane 9 is a vane creating centripetal channels for fluid flowing from the top to the bottom of reactor 1. For packing between two flat parallel walls, vane 9 preferably has the same width at its top and bottom.

Sheet 20 is cut along lines 41, 42 and 43, wherein horizontal line 43 corresponds to horizontal line 42 for the adjacent shape (not shown) that is similar to and below the shape 40 shown. Sheet 20 is folded approximately 90° toward the reader along lines 44 and folded approximately 180° away from the reader along line 45. The thus-formed vane 11 consists of the essentially flat surface bounded by lines 42, 43 and 44. Vane 11 is attached to the rest of the sheet by webs 47 along the two sides of the vane. Webs 47 are bounded by lines 41, 44 and 45. For an annular or circular packing, vane 11 is preferably narrower at its top than at its bottom as shown, and vane 11 creates centrifugal channels for fluid flowing from the top to the bottom of reactor 1. For packing disposed between two flat parallel plates, vane 47 preferably has the same width at its top and bottom. Line 48 represents an axial line along the inside surface of a reactor wall or tube wherein the packing contacts the tube at locations 49 and wherein gaps 50 are between the packing and the wall. The angle between vane 9 and line 49 and the angle between vane 11 and line 49 may be the same or may be different.

Referring to FIGS. 2 and 3, it is seen that bottom shape 30 in columns 21 is disposed only partially above the lower edge 23 of sheet 20. Cut edges 31 and 32 for bottom shape 30 of column 21 may result in voids or the absence of packing for such bottom shapes. Similarly, it is seen that top shape 40 in columns 22 is disposed only partially below upper edge 24 of sheet 20. Upper shapes 40 are accordingly truncated by top edge 24.

The sheet formed as described above is cut into lateral lengths and bent into a ring or annular shape or otherwise inserted near one or two reactor walls. The ends of rings may be joined by welding, adhesive or by interlocking the ends.

Figure 4:
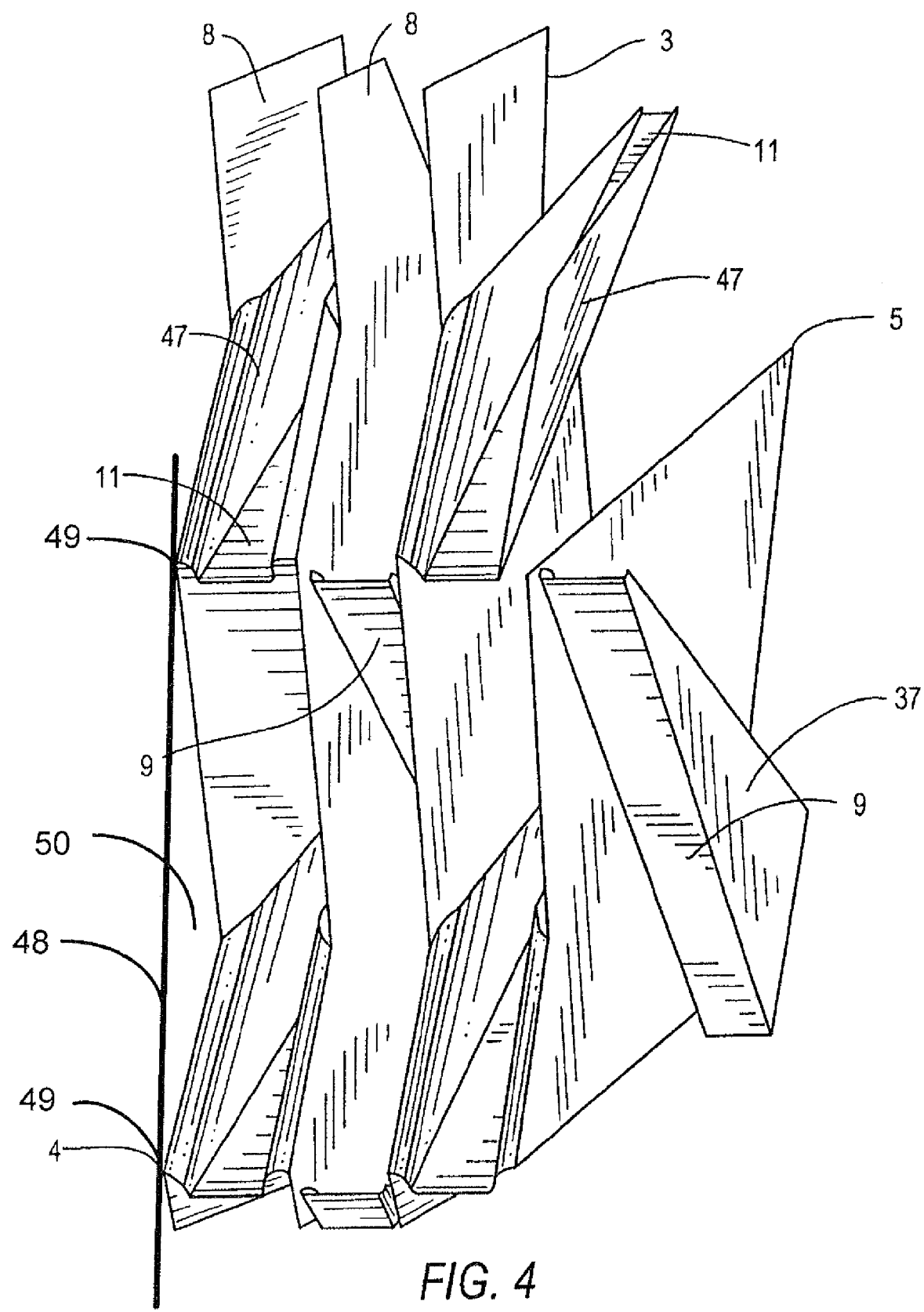
FIG. 4 is a perspective view of the structured packing of the invention.

Referring to FIG. 4, FIG. 4 is a cutaway perspective view of the structured packing of the invention for a cylindrical or annular reactor in which all items in FIG. 4 corresponding to the previously-described figures has the same numbering as set forth in the previously-described figures.

The reactor walls are not shown in FIG. 4. Alternating separating walls 8 of the packing are respectively illustrated with different shading darkness from each other. Note that the vanes and webs are not shaded. Packing 3 arrives at an outside diameter at location 4 and at an inside diameter at location 5. Centrifugal vanes 9 attached to the separating walls by webs 37 occupy centrifugal columns of the packing. Centripetal vanes 11 attached to the separating walls by webs 37 occupy centripetal columns of the packing. The centrifugal and centripetal columns alternate with each other around the casing and extend along the entire length of reactor 1, preferably from the reactor inlet to the reactor outlet.

In an alternative embodiment, multiple structured packing of the invention may be disposed in series within a single reactor between heat sources and heat sinks. For example, two or more of the structured packing units could be placed concentrically and adjacent to each other in an annular or circular reactor. Two or more of the structured packing units could be placed adjacent and parallel to each other between two plate-shaped reactor walls or between two reactor walls of different geometry.

The preceding embodiments are illustrative of the invention. It is, however, to be understood that other expedients known to those skilled in the art or disclosed herein may be employed without departing from the spirit of the invention or the scope of the claims which follow.

What is claimed is:

1. A reactor having an inlet, an outlet, at least one reactor wall and a structured packing, said structured packing comprising:

(a) a sheet folded back and forth, thereby forming a row of alternating first and second columns separated from each other by separating walls;
   (b) first and second direction vanes located in the respective first and second columns such that at least some of the first vanes are inclined at an oblique angle to the at least one reactor wall and at least some of the second vanes are inclined at an opposite oblique angle to the at least one reactor wall;
   (c) webs connecting at least some of the first and second vanes to the separating walls along at least one lateral side of at least some of the first and second vanes; and
   (d) a multiplicity of gaps between the separating walls and the reactor wall extending from the inlet to the outlet.

2. The reactor of claim 1 wherein the packing is formed from a single sheet.

3. The reactor of claim 1 wherein the sheet comprises a metal sheet or foil.

4. The reactor of claim 1 wherein the oblique angle of a first vane and the opposite oblique angle of a second vane have the same magnitude.

5. The reactor of claim 1 wherein the oblique angle of a first vane and the opposite oblique angle of a second vane have different magnitudes.

6. The reactor of claim 1 wherein the gaps are discontinuous.

7. The packing reactor of claim 1 wherein the reactor is cylindrical and contains inner and outer concentric walls and an annulus therebetween and the packing is disposed in such annulus.

8. The reactor of claim 1 wherein a catalyst is present on at least a portion of the sheet.

9. The reactor of claim 1 wherein the reactor comprises a catalytic reactor.

10. The reactor of claim 1 wherein the reactor comprises a heat exchanger.

11. The reactor of claim 1, wherein the at least one reactor wall is planar.

12. The reactor of claim 1, wherein the reactor comprises two wall elements that are planar and the packing is disposed between the two wall elements.

* * * * *